US012660057B2

(12) United States Patent
Pan et al.

(10) Patent No.: US 12,660,057 B2
(45) Date of Patent: Jun. 16, 2026

(54) SPACE LIGHTING SYSTEM BASED ON LIGHTING TARGET

(71) Applicants: Self Electronics Co., Ltd., Ningbo (CN); Self Electronics USA Corporation, Norcross, GA (US); Wanjiong Lin, Ningbo (CN)

(72) Inventors: Huangfeng Pan, Ningbo (CN); Ke Wang, Ningbo (CN); Jian Zhang, Ningbo (CN); Linji Wang, Ningbo (CN)

(73) Assignee: Self Electronics Co., Ltd., Ningbo City (CN)

( * ) Notice: Subject to any disclaimer, the term of this patent is extended or adjusted under 35 U.S.C. 154(b) by 140 days.

(21) Appl. No.: 18/754,819

(22) Filed: Jun. 26, 2024

(65) Prior Publication Data

US 2025/0040010 A1 Jan. 30, 2025

(30) Foreign Application Priority Data

Jul. 27, 2023 (CN) ......................... 202310936515.1

(51) Int. Cl.
*H05B 45/22* (2020.01)
*H05B 45/12* (2020.01)
(Continued)

(52) U.S. Cl.
CPC ............. *H05B 45/22* (2020.01); *H05B 45/12* (2020.01); *H05B 47/11* (2020.01); *H05B 47/195* (2020.01)

(58) Field of Classification Search
CPC ........ H05B 45/22; H05B 45/12; H05B 47/11; H05B 47/195; H05B 47/105;
(Continued)

(56) References Cited

U.S. PATENT DOCUMENTS

2004/0004129 A1* 1/2004 Silverbrook ............... B41J 2/01 235/487
2015/0296589 A1* 10/2015 Melanson .............. H05B 45/40 315/151
2021/0112647 A1* 4/2021 Coleman ................. G01S 17/42

FOREIGN PATENT DOCUMENTS

BR PI0515801 A * 8/2008 ............. H04B 3/542
ES 2715422 T3 * 6/2019 ........... H05B 47/199

* cited by examiner

*Primary Examiner* — Abdullah A Riyami
*Assistant Examiner* — Syed M Kaiser
(74) *Attorney, Agent, or Firm* — Wang Law Firm, Inc.

(57) ABSTRACT

A spatial illumination or lighting system based on a light color target has a control device and an actuating device, wherein the control device is configured to interact with a user and communicates with the actuating device, the control device receives identity identification information about the illuminated object input by the user, detects real-time light color data of the object and feeds the detection result back to the user, and sends the identity identification information about the object, the detection result and the light color target to the actuating device. The actuating device is arranged in the space or place, configured to communicate with the control device and implement lighting for the illuminated object: it receives the identification information, the detection result and the light color target of the object, calculates a comprehensive adjustment parameter corresponding to the object, and illuminates the object to achieve the desired light color target.

15 Claims, 2 Drawing Sheets

(51) Int. Cl.
*H05B 47/11* (2020.01)
*H05B 47/195* (2020.01)

(58) Field of Classification Search
CPC .... H05B 47/196; H05B 47/115; H05B 47/19; H05B 45/10; H05B 45/20; H05B 47/10; Y02B 20/40
See application file for complete search history.

SPACE LIGHTING SYSTEM BASED ON LIGHTING TARGET

RELATED APPLICATION

This application claims priority to Chinese Patent Application No. 202310936515.1, filed on Jul. 27, 2023.

FIELD OF THE TECHNOLOGY

The present invention relates to the field of illumination control and, in particular, to a space lighting system based on lighting target.

BACKGROUND

In scenarios where exhibits are displayed, such as in museums, adjusting the lighting parameters and position angles of the lamps is necessary to achieve the best visual presentation of the illuminated objects, such as paintings, in terms of color perception. Typically, such adjustments require on-site personnel to operate, resulting in inconvenience and poor repeatability. For instance, for overhead lamps, operators often need to climb to high places using ladders to manually adjust the position angles of the lamps and dim the lights, requiring multiple adjustments to achieve the desired effects. This process is time-consuming and the results vary depending on the individual, leading to poor repeatability.

Apart from museums, other spaces like supermarkets and stores also pursue lighting targets to achieve optimal display effects. Generally, for permanent exhibits in stable lighting conditions, after a period of adjustment, the optimal lighting conditions, including the parameters of the lighting fixtures on the exhibits and the physical positions of the fixtures relative to the exhibits, become fixed. However, when there are changes in ambient light, exhibit positions, or fixture positions, maintaining the achieved lighting effects becomes challenging.

Therefore, professionals in this field are dedicated to developing a spatial lighting system based on color targets that allows users to conveniently adjust relevant parameters, enabling quick adjustments to achieve the desired visual effects on illuminated objects.

BRIEF SUMMARY OF THE TECHNOLOGY

Given the above shortcomings of existing technologies, the technical problem that this invention aims to solve is the inconvenience and poor repeatability of manual adjustments to spatial lighting effects. of the prior art, the technical problem to be solved by the present invention is the problem of inconvenient operation and poor repeatability of manual adjustment of the lighting effect of the existing place.

In order to achieve the above purpose, the present invention provides a space lighting system based on lighting target, comprising a control device and an actuating device, wherein:

the control device is configured to interact with the user and is communicatively connected to the actuating device, and is configured to receive identification information about the illuminated object inputted by the user, to detect real-time light color data about the illuminated object and to feed back the detection results to the user, and is controlled to communicate with the actuating device and configured to establish a control relationship, and, after receiving the light color target set by the user, to send the identification information, detection results, and light color target of the illuminated object to the actuating device;

the actuating device is arranged in the spatial ambience, and is configured to be communicatively connected to the control device and to illuminate the illuminated object; and, after receiving the identification information, the detection result and the light color target of the illuminated object, to calculate a comprehensive adjustment parameter corresponding to the illuminated object, and, after adjusting according to the comprehensive tuning parameter, to illuminate the illuminated object to achieve the light color targets.

Further, the control device comprises a light color sensor, the light color sensor being used to detect at least real-time light color data of the surface of the illuminated object, the light color sensor being either connected to the control device or integrated into the control device.

Further, the control device includes a man-machine interface, the man-machine interface being integrated into the control device.

Further, the light color data and the light color target include, but are not limited to, one or more of illuminance, color temperature, color coordinates, and color rendering index.

Further, the control device establishes a group control of actuating devices affecting the illuminated object in the space, the grouped actuating devices acting work cooperatively on the illuminated object, and the control device and the actuating devices are matched one-to-one or one-to-many.

Further, the control device and the actuating device establish a control relationship by means of a direct-type/directional communication, and the identification information about the illuminated object, the detection result and the light color target are sent to the actuating device by means of a non-direct-type/non-directional communication, wherein said directional communication and said non-directional communication being wireless communication.

Further, the directional communication includes, but is not limited to, communication via laser, infrared connection.

Further, the non-directional communication includes, but is not limited to, communication via Bluetooth, WiFi, ZigBee, Z-Wave, Sub-G, 2.4 GHz, 4G, 5G connections.

Further, the comprehensive adjustment parameters include at least one of an illumination adjustment parameter and a mechanical adjustment parameter.

Further, the illumination adjustment parameters include adjustment parameters for illuminance, color temperature, color coordinates, spot size, and spot shape; and the mechanical adjustment parameters include adjustment parameters for displacement, and irradiation deflection angle.

Further, at least one cooperating or synergistic device is included for storing setting experiences; wherein the actuating device and the cooperating device, or the control device and the cooperating device communicate with each other and interact with the data; wherein the setting experiences include identification information about an illuminated object and a corresponding light color target.

Further, the cooperating devices are connected to the cloud platform via a network and transmit setup experiences to each other.

In another embodiment of the present invention, the control devices are connected to the cloud platform via a network and transmit to each other a setting experience, the setting experience including identification information about the illuminated object and a corresponding light color target.

The present invention also provides a method of adjusting spatial illumination based on lighting target, comprising the following steps:

S1: the user inputs identification information about the illuminated object through the control device, detects real-time light color data, sets a light color target at the control device, communicates with the actuating device and establishes a control relationship, and sends the identification information about the illuminated object, the detection result and the light color target to the actuating device;

S2: the identification information about the illuminated object, the detection result and the light color target sent by the control device are received by the actuating device, and the comprehensive tuning parameters of the illuminated object are calculated and obtained;

S3: the lighting fixture is controlled by the actuating device to illuminate the illuminated object after adjusting the lighting parameters and mechanical parameters according to the according to the comprehensive adjustment parameters;

S4: the adjusted light color data of the illuminated object is detected again, and, if the light color target is reached, the adjustment is stopped; and if not, the steps S1~S3 are repeated.

Further, the method my comprise: step S5 after step S4, when the illuminated object reaches the desired light color target, the user sends an interaction request through the control device, and the control device or the actuating device transmits a setting experience to the cooperating device after receiving the request, said setting experience comprises identification information about the illuminated object and the light color target.

Further, step S5 may also comprise: the cooperating device establishes a connection to the cloud platform via the network, and uploads said setting experience to the cloud platform after receiving the setting experience.

Further, step S1 may further comprise: after the user inputs the identification information about the illuminated object, a reading request is sent to the actuating device via the control device, the actuating device retrieves the setting experience from the cooperating device based on the received identification information about the illuminated object experience, and obtains the light color target to be set from the setting experience.

Even further, the actuating device may retrieve the setting experience from the cooperating device, and the cooperating device may download the setting experience from the cloud platform.

Technical Effects

The spatial illumination or lighting system based on lighting target of the present invention can achieve repeatable and optimal lighting effects for illuminated objects quickly by storing user settings and sharing data, identifying light color targets based on the identity recognition information of the illuminated objects, and intelligently adjusting them through actuating devices.

The following description will further illustrate the conceptualization, specific structure, and technical effects of the present invention with reference to the accompanying drawings to fully understand the purpose, features, and effects of the present invention.

DETAILED DESCRIPTION OF THE INVENTION

The technical embodiments of the present invention will be described in the following. clearly and completely in connection with the accompanying drawings, and it is evident that the described embodiments are a part of the embodiments of the present invention and not all of the embodiments. Based on the embodiments in the present invention, all other embodiments obtained by a person of ordinary skill in the art without making creative labor fall within the scope of protection of the present invention.

Furthermore, the technical features involved in the different embodiments of the present invention described below may be combined with each other as long as they do not constitute a conflict with each other.

Figure 1:
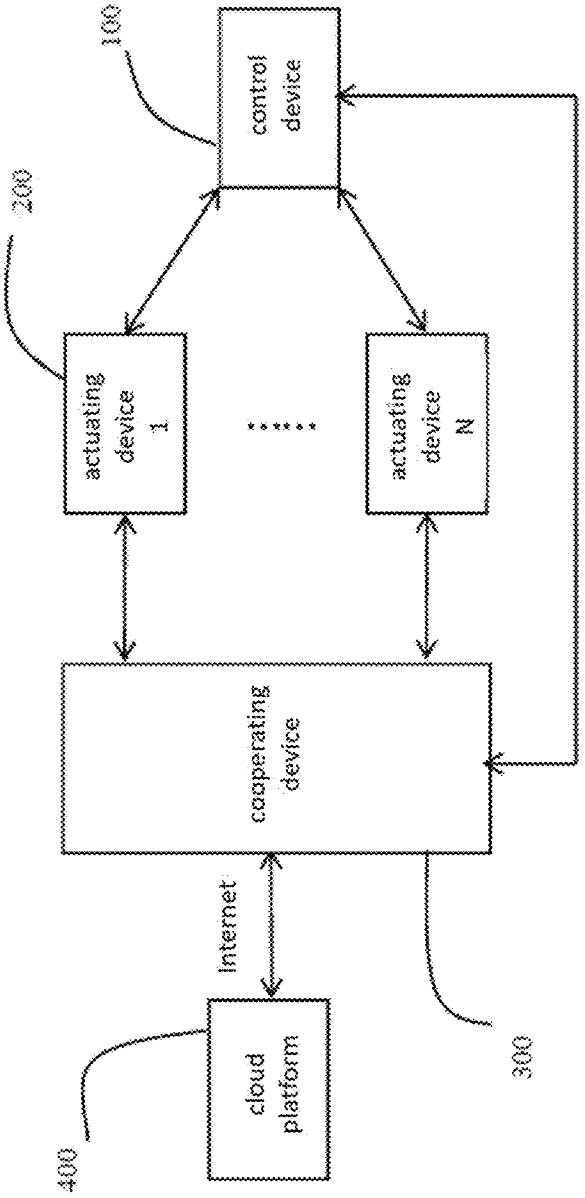
FIG. 1 is a schematic structural diagram of one embodiment of a space lighting system based on lighting target of the present invention.

FIG. 1 is an embodiment of a space lighting system based on lighting target provided by the present invention. The spatial ambience or space herein refers to a space suitable for displaying exhibits such as an arena, a supermarket, a shopping mall, a store, a museum of literature, and the like. In the spatial ambience, the illumination object is located at a predetermined placement position, such as a painting being fixed to a wall, and a luminaire is mounted at a position suitable for illuminating the wall, such as the luminaire illuminating the painting on the wall from the ceiling.

The spatial illumination or lighting system of the present invention is based on a light color targets and includes a control device 100 and an actuating device 200. The control device 100 is configured to interact with a user and is communicatively connected to at least one the actuating device 200: it receives user input of identification information about the illuminated object, detects real-time light color data of the illuminated object and feeds back the detection result to the user, is controlled to communicate with the actuating device 200 and establishes a control relationship. After receiving the light color target set by the user, the identification information, the detection result and the light color target of the illuminated object are sent to the actuating device 200, which is arranged in a space or place and configured to be communicatively connected to the control device 100 and to perform lighting of the illuminated object: after receiving the identification information, the detection result and the light color target of the illuminated object, it calculates the comprehensive adjustment parameter corresponding to the illuminated object, and according to the comprehensive adjustment parameter, it calculates the light color target of the illuminated object, and calculates the lighting color target of the illuminated object. After receiving the identification information about the illuminated object and the detection result and the light color target, it calculates a comprehensive adjustment parameter for the corresponding illuminated object, and performs adjustment according to the comprehensive adjustment parameter to illuminate the illuminated object to achieve the light color target. The actuating device 200 can be set up as one or multiple actuating devices (actuating device 1, actuating device 2, . . . actuating device N), which can individually or cooperatively realize illumination in accordance with the comprehensive tuning parameters.

The control device 100 includes a light color sensor, which is detachably connected to or integrated into control device 100. The light color sensor can be a color sensor, color temperature sensor, or illuminance sensor, or a sensor with a combination of the above functions. The light color sensor is used to detect real-time light color data on the surface of the illuminated object, including relevant data such as illuminance, color temperature, color coordinates, and color rendering index. control device 100 can be designed for handheld use by users. When close to the illuminated object, it can detect the real-time light color data of the illuminated object through the light color sensor and then transmit the data to control device 100.

Additionally, each illuminated object has its own identification information for mutual differentiation. Users can input this identification information into control device 100, such as the name or code of the artwork. Users can also input specific location information of the illuminated object, such as the center point or key illumination point, through human-machine interaction with control device 100, enabling actuating device 200 to obtain relative positions with respect to the illuminated object.

In a specific embodiment of control device 100, a human-machine interaction terminal or man-machine interface is included, which is integrated into control device 100. Additionally, the human-machine interaction terminal has a display screen or buttons for data display and input. Specifically, the human-machine interaction terminal can be a remote control, mobile phone, tablet, or other interactive device. After detecting the real-time light color data of the illuminated object, users can view the displayed detection results through the human-machine interaction terminal and then input the desired light color target to control device 100. Light color data and light color targets include but are not limited to illuminance, color temperature, color coordinates, and color rendering index.

The control device 100 and actuating device or actuator 200 establish a control relationship through directional communication, such as laser or infrared connection communication, allowing users to easily operate control device 100 to specify one or more actuating devices 200 to join the matching objects. This enables the actuating devices 200 in the space that affect the illuminated object to establish grouped control through control device 100, and the grouped actuating devices 200 work together on the illuminated object. Furthermore, through non-directional communication, including but not limited to Bluetooth, WiFi, ZigBee, Z-Wave, Sub-G, 2.4 GHz, 4G, 5G, control device 100 sends the identification information, detection results, and light color targets of the illuminated object to actuating device 200 so that all actuating devices 200 can receive the transmitted information. Here, directional communication and non-directional communication are both wireless communication.

The actuating device 200 calculates the comprehensive adjustment parameters of the illuminated object based on the received identification information, detection results, and light color targets of the illuminated object, and performs a series of adjustments according to the comprehensive adjustment parameters to illuminate the illuminated object. To achieve illumination, each actuating device 200 includes luminaires, and actuating device 200 adjusts the illumination effect on the illuminated object based on the comprehensive adjustment parameters, with the ultimate goal of achieving the light color target.

The comprehensive adjustment parameters include at least one of illumination adjustment parameters and mechanical adjustment parameters. Illumination adjustment parameters include parameters for adjusting illuminance, color temperature, color coordinates, spot size, and spot shape when executing illumination with actuating device 200. Mechanical adjustment parameters include parameters for adjusting displacement and irradiation deflection angle when executing illumination with actuating device 200.

The actuating device 200 includes an intelligent processing module, which intelligently processes the detection results and user-input light color targets based on pre-input teaching data by the user. For example, when the detection results are relatively darker than the light color target, the intelligent processing module adjusts the lighting parameters according to the set rules to provide brighter lighting conditions. Conversely, when the detection results are brighter than the light color target, the module adjusts the lighting conditions to be darker, gradually bringing the illuminated object closer to the light color target. For instance, based on the position information of the illuminated object, whether entered by the user or automatically obtained, when the spot position shifts, the intelligent processing module adjusts the illumination angle of actuating device 200 or generates displacement to move the spot. Furthermore, for more complex light color targets, when users set multiple key illumination points for the illuminated object, the intelligent processing module adjusts actuating devices 200 in a coordinated manner after grouping through control, thereby achieving coordinated illumination.

In a specific embodiment of actuating device 200, it includes a dimming module and luminaires. For LED luminaires, dimming the LED luminaires is a known technology and will not be elaborated here. Based on the received detection results and user-input light color targets, such as the user inputting the irradiation position on the illuminated object and the required illuminance or spot size, actuating device 200 intelligently determines the lighting conditions and automatically adjusts parameters such as illuminance, color temperature, color coordinates, spot size, and spot shape of the luminaires through the dimming module. Additionally, actuating device 200 intelligently determines the required mechanical adjustment parameters, calculates the optimal irradiation deflection angle or moving position from the luminaires inherent to actuating device 200, and adjusts accordingly, combined with the received identification information of the illuminated object.

In cases where multiple actuating devices 200 are controlled by control device 100, multiple actuating devices 200 are grouped together, and the comprehensive adjustment parameters are set to make multiple actuating devices 200 cooperate to illuminate the illuminated object.

Furthermore, the light color target-based spatial illumination or lighting system of the present invention further includes a cooperating device 300, which is used to store setting experience. Communication between actuating device 200 and cooperating device 300, or between control device 100 and cooperating device 300, can occur, for example, through local network data interaction. Setting experience includes at least the identification information of the illuminated object and the corresponding light color targets. When retrieving setting experience through cooperating device 300, users can obtain the required light color targets by searching for the identification information of the illuminated object (such as the name of the artwork) without reconfiguration, saving time. The advantage of setting cooperating device 300 is that by establishing a database corresponding to the identification information and light color targets of the illuminated object, users can conveniently retrieve previous setting experience when the environment of the illuminated object is rearranged, such as changes in the position of the illuminated object or ambient light. This allows users to quickly and reasonably adjust the lighting to achieve the light color target, saving a significant amount of time for debugging and trying.

As one embodiment of the method, the communication between the aforementioned control device 100 or actuating device 200 and the cooperating device 300 is initiated based on the request signal sent by control device 100. Users send commands to cooperating device 300 to read or write data through control device 100.

Furthermore, the cooperating device 300 is connected to the cloud platform 400 via a network connection, e.g. Internet, enabling the uploading or downloading of setting experiences to/from cloud platform 400. The advantage of mutual transmission of setting experiences between cooperating device 300 and cloud platform 400 is that it facilitates users beyond local operations.

By sharing data, users can obtain the required setting experience at different locations. For example, if a user has obtained an optimal setting experience for the same lighting object through long-term adjustments, resulting in the best display effect under an optimal color target, this can be shared through the cloud platform 400. In different environments and for different users, the best color target and corresponding setting experience can also be obtained through such sharing, allowing for the rapid provision of good lighting effects for the lighting object and achieving uniformity.

Figure 2:
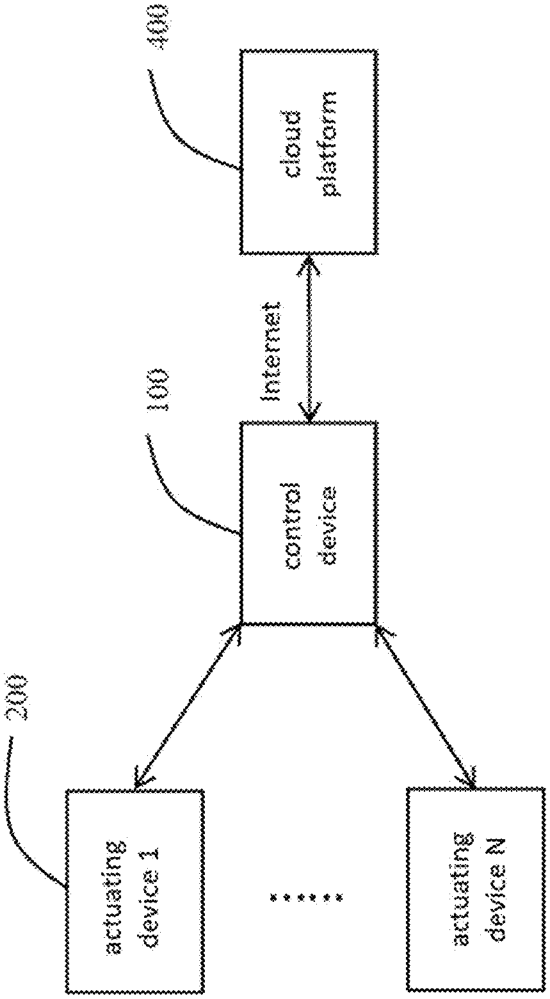
FIG. 2 is a schematic structural diagram of another embodiment of a space lighting system based on lighting target of the present invention.

As shown in FIG. 2, another embodiment provided by the present invention involves control device 100 communicating with cloud platform 400 via a network connection and exchanging setting experiences. For example, control device 100 may be a mobile phone connected to cloud platform 400 via 4G communication, synchronously transferring setting experiences.

Accordingly, the present application also provides a space lighting adjustment method based on color targets, comprising the following steps:

S1. The user inputs the identity recognition information of the lighting object through control device 100, detects the real-time color data on the surface of the lighting object, sets the color target in control device 100, communicates with actuating device 200, establishes a control relationship, and sends the identity recognition information of the lighting object, detection results, and color target to actuating device 200.

S2. actuating device 200 receives the identity recognition information, detection results, and color target of the lighting object sent by control device 100, and calculates the comprehensive calibration parameters of the lighting object.

S3. actuating device 200 controls the luminaires to adjust the lighting parameters and mechanical parameters according to the comprehensive calibration parameters, and illuminates the lighting object.

S4. The user checks the adjusted color data of the lighting object again. If the color target is reached, the adjustment is stopped. If the color target is not reached, steps S1 to S3 are repeated.

Furthermore, the adjustment method may also include the following steps:

S5. After the lighting object reaches the required color target, the user sends an interaction request through control device 100. Upon receiving the request, control device 100 or actuating device 200 transmits the setting experience to cooperating device 300. The setting experience includes the identity recognition information and color target of the lighting object.

Step S5 also includes cooperating device 300 connecting to cloud platform 400 through a network, cooperating device 300 receiving the setting experience, and uploading the setting experience to cloud platform 400, thereby synchronizing the setting experience between cooperating device 300 and cloud platform 400 for easy retrieval in the future.

Optionally, in Step S1, after the user inputs the identity recognition information of the lighting object, control device 100 sends a read request to actuating device 200. actuating device 200 reads the setting experience from cooperating device 300 based on the received identity recognition information of the lighting object, obtaining the color target to be set from the setting experience.

Optionally, before actuating device 200 reads the setting experience from cooperating device 300, cooperating device 300 first downloads the setting experience from cloud platform 400. This allows for a preliminary judgment of the required setting experience from both local and cloud platform 400, such as selecting the most recently updated setting experience as the best setting experience, enabling users to quickly determine the optimal color target and allowing actuating device 200 to perform lighting adjustments based on this optimal color target.

The above detailed description illustrates preferred specific embodiments of the present invention. It should be understood that those skilled in the art in this field can make many modifications and variations based on the concept of the present invention without the need for creative effort. Therefore, all technical solutions that can be obtained by logical analysis, reasoning or limited experimentation by the skilled person in the art on the basis of the prior art according to the idea of the present invention shall be within the scope of protection determined by the claims.

What is claimed is:

1. A space lighting system based on lighting target, characterized in that it comprises a control device (100) and at least one actuating device (200), wherein:

the control device (100) is configured to interact with a user and is communicatively connected to the actuating device (200), and is configured to receive identification information about the illuminated object inputted by the user, to detect real-time light color data about the illuminated object and to feed back the detection results to the user, and is controlled to communicate with the actuating device (200) and configured to establish a control relationship, and, after receiving a light color target set by the user, to send the identification information, detection results, and light color target of the illuminated object to the actuating device (200);

the actuating device (200) is arranged in the spatial ambience, and is configured to be communicatively connected to the control device (100) and to illuminate the illuminated object; and, after receiving the identification information, the detection result and the light color target of the illuminated object, to calculate a comprehensive adjustment parameter corresponding to the illuminated object, and, after adjusting according to the comprehensive adjustment parameter, to illuminate the illuminated object to achieve the light color targets;

the control device (100) and the actuating device (200) establish a control relationship through directional communication, and send the identification information about the illuminated object, the detection result, and the light color target to the actuating device (200) through non-directional communication, said directional communication and said non-directional communication being wireless communication.

2. The space lighting system based on lighting target as claimed in claim 1, characterized in that the control device (100) comprises a light color sensor, the light color sensor being used to detect at least real-time light color data about the surface of the illumination object, the light color sensor being either connected to the control device (100) or integrated into the control device (100).

3. The space lighting system based on lighting target as claimed in claim 1, characterized in that the control device (100) comprises a man-machine interface, the man-machine interface being integrated into the control device (100).

4. The space lighting system based on lighting target as claimed in claim 1, characterized in that the real-time light color data and the light color targets include, but are not limited to, one or more of illuminance, color temperature, color coordinates, and color rendering index.

5. The space lighting system based on lighting target as claimed in claim 1, characterized in that the control device (100) establishes a group control of actuating devices (200) affecting the illuminated object in the space, the grouped actuating devices (200) work cooperatively on the illuminated object, and the control device (100) and the actuating devices (200) are matched one-to-one or matched one-to-many.

6. The space lighting system based on lighting target as claimed in claim 1, characterized in that the directional communication includes, but is not limited to, communication via laser, infrared connection.

7. The space lighting system based on lighting target as claimed in claim 1, characterized in that the non-directional communication includes, but is not limited to, communication via Bluetooth, WiFi, ZigBee, Z-Wave, Sub-G, 2.4 GHZ, 4G, 5G connection.

8. The space lighting system based on lighting target as claimed in claim 1, characterized in that the comprehensive adjustment parameter includes at least one of an illumination adjustment parameter and a mechanical adjustment parameter.

9. The space lighting system based on lighting target as claimed in claim 8, characterized in that the illumination adjustment parameters include adjustment parameters for illuminance, color temperature, color coordinates, spot size, and spot shape; and the mechanical adjustment parameters include adjustment parameters for displacement, and irradiation deflection angle.

10. The space lighting system based on lighting target as claimed in claim 1, characterized in that it further comprises a cooperating device (300) for storing setting experiences; the actuating device (200) and the cooperating device (300), or the control device (100) and the cooperating device (300) communicating with each other and interacting with the data; the setting experiences include identification information about an illuminated object and a corresponding light color target.

11. The space lighting system based on lighting target as claimed in claim 10, characterized in that the cooperating devices (300) are connected to a cloud platform (400) via a network and transmit setting experiences to each other.

12. The space lighting system based on lighting target as claimed in claim 1, characterized in that the control device (100) is connected to the cloud platform (400) via a network and transmits to each other a setting experience, the setting experience comprising identification information about the illuminated object and a corresponding light color target.

13. A method of adjusting spatial illumination based on lighting target, characterized in that it comprises the following steps:

S1: a user inputs identification information about an illuminated object through a control device (100), detects real-time light color data, sets a light color target at the control device (100), communicates with an actuating device (200) and establishes a control relationship, and sends the identification information about the illuminated object, a detection result and the light color target to the actuating device (200);

S2: the identification information about the illuminated object, the detection result and the light color target sent by the control device (100) are received by the actuating device (200), and the comprehensive adjustment parameters of the illuminated object are calculated and obtained;

S3: the lighting fixture is controlled by the actuating device (200) to illuminate the illuminated object after adjusting the lighting parameters and mechanical parameters according to the according to the comprehensive adjustment parameters;

S4: the adjusted light color data of the illuminated object is detected again, and, if the light color target is reached, the adjustment is stopped; and if not, the steps S1~S3 are repeated;

S5: after step S4, when the illuminated object reaches the desired light color target, the user sends an interaction request through the control device (100), and the control device (100) or the actuating device (200) receives the request and transmits a setting experience to a cooperating device (300), said setting experience comprising the identification information about the illuminated object and the light color target; the cooperating device (300) establishes a connection to the cloud platform (400) via the network, and uploads said setting experience to the cloud platform (400) after receiving the setting experience.

14. The method of adjusting spatial illumination based on lighting target as claimed in claim 13, characterized in that step S1 further comprises: after the user inputs the identification information about the illuminated object, a reading request is sent to the actuating device (200) via the control device (100), the actuating device (200) retrieves the setting experience from the cooperating device (300) based on the received identification information about the illuminated object experience, and obtains the light color target to be set from the setting experience.

15. The method of adjusting spatial illumination based on lighting target as claimed in claim 14, characterized in that before the actuating device (200) retrieves the setting experience from the cooperating device (300), the cooperating device (300) downloads the setting experience from the cloud platform (400).

* * * * *